US012781706B2

(12) United States Patent
Weber

(10) Patent No.: US 12,781,706 B2
(45) Date of Patent: Nov. 3, 2026

(54) METHOD FOR OPTIMIZING A WIND POWER INSTALLATION

(71) Applicant: Wobben Properties GmbH, Aurich (DE)

(72) Inventor: Marcel Weber, Aurich (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 41 days.

(21) Appl. No.: 18/777,780

(22) Filed: Jul. 19, 2024

(65) Prior Publication Data

US 2025/0027477 A1 Jan. 23, 2025

(30) Foreign Application Priority Data

Jul. 21, 2023 (EP) .................................... 23187084

(51) Int. Cl.
*F03D 7/04* (2006.01)
*F03D 7/02* (2006.01)

(52) U.S. Cl.
CPC ........... *F03D 7/046* (2013.01); *F03D 7/0276* (2013.01); *F03D 7/028* (2013.01); (Continued)

(58) Field of Classification Search
CPC ........ F03D 7/046; F03D 7/0276; F03D 7/028; F05B 2270/20; F05B 2270/327; F05B 2270/335; F05B 2270/708
See application file for complete search history.

(56) References Cited

U.S. PATENT DOCUMENTS 9,797,377 B2 * 10/2017 Bhaskar .................. F03D 9/257
10,253,758 B2 * 4/2019 Tyber ...................... F03D 7/048
(Continued)

FOREIGN PATENT DOCUMENTS

EP 2 679 813 A1 1/2014
EP 4 102 059 A1 12/2022

*Primary Examiner* — Tulsidas C Patel
*Assistant Examiner* — Thomas K Quigley
(74) *Attorney, Agent, or Firm* — Polsinelli PC

(57) ABSTRACT

The present disclosure relates to a method for assessing a wind power installation, wherein a comparison is made between a test wind power installation and a comparison wind power installation for assessment purposes, comprising the steps of: synchronously operating the test wind power installation and the comparison wind power installation in an adjustment interval in an adjustment mode, in which the test wind power installation and the comparison wind power installation have matching operating settings, synchronously recording performance data relating to both wind power installations in each case in the adjustment interval in the adjustment mode, modifying the test wind power installation and/or the comparison wind power installation in a modification step such that the test wind power installation and the comparison wind power installation differ from one another, synchronously operating the test wind power installation and the comparison wind power installation, which differ from one another, at least in a comparison interval in a comparison mode, synchronously recording performance data in the comparison mode, and evaluating the performance data recorded in the adjustment mode and comparison mode in an evaluation step.

14 Claims, 3 Drawing Sheets

(52) U.S. Cl.
CPC ..... *F05B 2270/20* (2013.01); *F05B 2270/327* (2013.01); *F05B 2270/335* (2013.01); *F05B 2270/708* (2013.01)

(56) References Cited

U.S. PATENT DOCUMENTS

| | | | | |
|---|---|---|---|---|
| 10,487,804 | B2 * | 11/2019 | Evans | F03D 7/048 |
| 10,641,244 | B2 * | 5/2020 | Nielsen | F03D 7/028 |
| 10,982,653 | B2 * | 4/2021 | Nielsen | G05B 19/042 |
| 11,274,656 | B2 * | 3/2022 | Lebosq | F03D 7/0276 |
| 11,639,711 | B2 * | 5/2023 | Motto | G05B 17/02<br>702/182 |
| 12,044,215 | B2 * | 7/2024 | Gollnick | F03D 7/028 |
| 2011/0270450 | A1 * | 11/2011 | Gujjar | H02J 3/381<br>290/44 |
| 2011/0309621 | A1 * | 12/2011 | Nielsen | F03D 7/0276<br>290/44 |
| 2012/0271593 | A1 * | 10/2012 | Uluyol | F03D 7/048<br>702/182 |
| 2014/0239639 | A1 * | 8/2014 | Bai | F03D 7/048<br>290/44 |
| 2015/0308413 | A1 * | 10/2015 | Bhaskar | F03D 9/257<br>290/44 |
| 2016/0084224 | A1 * | 3/2016 | Tyber | F03D 17/00<br>700/287 |
| 2019/0170119 | A1 * | 6/2019 | Nielsen | G05B 19/042 |
| 2020/0263667 | A1 * | 8/2020 | Nielsen | G05B 19/042 |
| 2020/0309093 | A1 * | 10/2020 | Lebosq | F03D 17/00 |

* cited by examiner

METHOD FOR OPTIMIZING A WIND POWER INSTALLATION

CROSS-REFERENCE TO RELATED APPLICATIONS

This application claims the benefit of priority to European application number 23187084.1, filed on Jul. 21, 2023, entitled "Method for Optimizing a Wind Power Installation", which is incorporated by reference herein in its entirety.

The present disclosure relates to a method for optimizing a wind power installation. In addition, the present disclosure relates to an arrangement of a plurality of wind power installations for optimizing at least one of the wind power installations.

Wind power installations are known; they generate electrical power from wind and there is a need to improve the performance of existing wind power installations or to develop wind power installations with improved performance.

The performance of a wind power installation depends on its components, which can also be referred to here as component parts, and it depends on the way in which the respective wind power installation is operated, that is to say on operating settings of the wind power installation.

A wind power installation can be optimized by changing component parts and/or operating settings. Changing a component part can mean, for example, adding a component part such as adding vortex generators or serrated trailing edges. Changing component parts can also mean swapping attachments such as the aforementioned vortex generators or serrated trailing edges with other vortex generators or serrated trailing edges. It can also mean completely replacing a component part, such as one rotor blade or all three rotor blades of a three-blade wind power installation. However, a generator can also be changed or swapped, for example.

Changing operating settings can mean changing an operating characteristic curve, or changing a value for an initial storm wind speed from which the wind power installation is curtailed. It can also mean changing a pitch characteristic curve which specifies a blade angle profile as a function of a power, in particular a mechanical or electrical power, in particular a generator power, or output power of the wind power installation, or as a function of a torque, in particular a generator torque.

The problem with all these possible changes with the aim of optimizing the wind power installation is assessing the resulting result of the respective measure, i.e. the change of component parts or the change of operating settings. In other words, it is difficult to assess whether a change has actually increased performance. It is even more difficult to quantitatively assess such improved performance in terms of magnitude.

Basically, it is possible to make a change and thus monitor together whether and to what extent the output power of the wind power installation changes, in order to thus compare the power before and after the change. However, it is problematic here that the wind speed is not constant in reality. Changing component parts in particular can take hours or days, and after that, a changed wind speed can usually be assumed. Moreover, not only the power, in particular the output power of the wind power installation, is a measure of performance, but also other criteria such as noise emission and loads on the wind power installation characterize the performance of the wind power installation.

In order to take into account variations in the wind speed, the wind speed could be monitored in order to then make comparisons only at the same wind speeds. But even here, the idea is based on the fact that the wind speed is constant at least temporarily, both for a time before and after the change. However, such assumptions do not correspond to reality and it is therefore very difficult to take into account the wind fluctuations when assessing the change in power caused by changing the component parts or operating settings, i.e. to specifically remove deviations in the wind speeds.

Although extensive simulation tools that can achieve such removal are available today, it is desirable to actually really assess changes made and not rely solely on the simulations that would be necessary for said removal. In any case, changes in the component parts and/or operating settings can be checked and even assessed in advance by means of simulations. However, the result is and remains a simulation, and it would be desirable to carry out a real-world check with as little computational adjustment as possible.

It should also be taken into account that not only the wind speed, including temporal fluctuations, can influence the power generated by the wind power installation, but also further influencing variables such as the air density or gustiness of the wind. Removing such further influencing factors by means of corresponding modelling is very complicated and also not arbitrarily accurate.

The present disclosure is consequently based on the object of addressing at least one of the aforementioned problems. In particular, the intention is to propose a solution that can be used to assess changes in the wind power installation with regard to the resulting performance as accurately and reliably as possible. The intention is at least to propose an alternative to previously known solutions.

According to the present disclosure, a method as claimed in claim 1 is proposed. The method therefore relates to the assessment or optimization of a wind power installation. Optimization can be carried out by assessing changes to the wind power installation and, in the event of a positive assessment, that is to say if an increase in the performance has been determined, being able to retain the changes, as a result of which the wind power installation or its performance has been improved.

It is therefore proposed that a comparison be made between a test wind power installation and a comparison wind power installation for assessment purposes. The method therefore uses at least two wind power installations, namely the test wind power installation and the comparison wind power installation. They are compared, as explained below, and corresponding conclusions are drawn from the comparison; in particular, the performance is assessed.

One step of the method relates to synchronous operation of the test wind power installation and the comparison wind power installation in an adjustment interval in an adjustment mode, in which the test wind power installation and the comparison wind power installation have matching operating settings. They can be structurally identical or already different, e.g. have different attachments, different rotor blades and/or different generators. In particular, it is taken as a basis here that the test wind power installation and the comparison wind power installation are installed adjacent to one another, in particular in such a way that they are exposed to substantially the same wind conditions. Depending on the installation location and wind direction, the wind power installations can influence one another and, in such a case, the method can be suspended until the wind direction is again such that the wind power installations do not influence one another.

In any case, it is initially proposed that the two wind power installations are operated in a substantially synchronous and identical manner. This allows them or their behaviour to be adjusted. This operation in the adjustment interval is referred to as the adjustment mode. For example, despite the same preconditions, the wind power installations may not operate identically. For example, manufacturing inaccuracies of the rotor blades can play a role here, or the fact that both wind power installations are only installed adjacent to one another and of course cannot be located in the same place. This can therefore also lead to differences. Differences are thus recorded despite structurally identical wind power installations.

However, it also comes into consideration that the wind power installations are already structurally different. The effects of these structural differences are then recorded in the adjustment mode. The differences in performance, loads and sound that have been detected can therefore be attributed to the structural differences, at least substantially, because of the otherwise identical operating settings.

Such differences can be recorded during synchronous operation in the adjustment interval and taken into account later, if necessary. Accordingly, synchronous recording of performance data relating to both wind power installations in each case in the adjustment interval is also proposed in this respect. Thus, performance data relating to the test wind power installation and the comparison wind power installation are recorded in each case. For example, this can be in each case a temporal profile of the output power of the wind power installation. In order to clearly explain this using a simplified example, this test could show a power difference of 5% between the two wind power installations, that is to say between the test wind power installation and the comparison wind power installation, in the adjustment interval. Of course, more complex relationships can also arise, for example a dependence of the difference between the two power values on an azimuth orientation, i.e. on the respective wind direction, and/or a dependence on the level of the wind speed, to name just two examples.

As performance data, noise emissions at the wind power installation and/or noise immissions at an immission point can also be recorded and compared. The noise generation can also indicate the performance of the wind power installation, or at least be used as an indicating criterion. Performance data can therefore be performance results or power values.

Loads acting on a blade root, a rotor hub, on bearings or on the base of the tower of the wind power installation, to name just a few examples, can also indicate the performance of the wind power installation or at least be used as an indicating criterion.

As a further step, the test wind power installation is modified such that the test wind power installation and the comparison wind power installation differ. Modifying can mean physically modifying one or more component parts and/or modifying one or more operating settings. After this modification step, the test wind power installation and the comparison wind power installation therefore differ from one another.

Then, the test wind power installation and the comparison wind power installation, which differ from one another, are synchronously operated at least in a comparison interval in a comparison mode, and performance data are synchronously recorded in this comparison mode. Such performance data can be operating data, which also applies to the adjustment mode, or the performance data are determined from operating data. For example, loads on the rotor hub can be derived from the rotor speed and the output power generated, which can both be operating data, to name one example.

Finally, the performance data recorded in the adjustment mode and in the comparison mode are evaluated in an evaluation step. This means that performance data are available here and allow the modification to be assessed.

The present disclosure thus provides the following solution. In the adjustment mode, fundamental differences, which can be referred to as basic deviations, between the test wind power installation and the comparison wind power installation are determined and are taken as a basis for the further evaluation. However, the differences should be small and are therefore used in particular to improve accuracy. In the comparison mode, the test wind power installation and the comparison wind power installation are then directly compared. This allows the effects of the modifications on the performance data to be detected and recorded. Taking into account the basic deviations from the adjustment mode, the modifications can thus be assessed very accurately.

For example, the test wind power installation can receive changed rotor blades, which are provided with vortex generators for example, in the modification step. Differences in the performance data detected in the comparison mode can therefore be assigned to the changed rotor blades, taking into account, in particular by removing, the basic deviations. The performance of the changed rotor blades can thus be assessed.

However, it also comes into consideration that only one operating characteristic curve is changed in the modification step, i.e. no structural changes are made. The performance of the changed operating characteristic curve can then be inferred from the performance data recorded in the comparison mode.

In this respect, synchronous recording of performance data relating to both wind power installations in each case in the at least one comparison interval is proposed, and it is proposed to evaluate the performance data in order to assess differences in performance in the at least one comparison interval. The performance data from the adjustment interval are also taken into account. They are preferably included only as information relating to fundamental differences between the two wind power installations, in particular in order to be removed.

For example, the test wind power installation could have attachments on the rotor blade in a comparison interval that the comparison wind power installation does not have. When capturing the performance data, it could be found that, in the comparison interval, that is to say in particular initially in a first comparison interval, the test wind power installation generated 3% more power than the comparison wind power installation. However, if, for example, it has been found during synchronous operation in the adjustment interval that the test wind power installation generates 1% more power, this can be taken into account when assessing the performance in the second comparison interval. In the simplified example, the 1% increase in the power of the test wind power installation in the adjustment interval would then be subtracted from the result in the first comparison interval. In this example, however, there would still be a 2% increase in power for the test wind power installation due to the changed conditions, i.e. the added attachment on the rotor blades mentioned in the example.

The result could therefore be that the attachments mentioned by way of example lead to a 2% increase in power. The result could be that the attachments are then retrofitted on all structurally identical wind power installations, to explain it in a simplified manner. On the other hand, it is proposed that further tests be carried out first, namely in further comparison intervals, in order to also test other changes in order to thereby find an optimum if possible.

However, the power consideration mentioned by way of example, which was an increase in power in the example mentioned, is only one assessment of the performance. A consideration of noise emissions or noise immissions, and also a consideration of loads, can also be taken into account when assessing the performance.

According to one aspect, it is proposed that a further change to at least one of the operating settings on the test wind power installation and/or the comparison wind power installation takes place in at least one further comparison interval in the comparison mode, performance data relating to both wind power installations in each case are recorded synchronously in the at least one further comparison interval, and the performance data recorded in the at least one further comparison interval are evaluated for the purpose of assessing differences between the test wind power installation and the comparison wind power installation.

It is therefore proposed not only to make one change in the comparison mode, but to make further changes. This may mean that, in the case of a structural modification in the modification step, this modification carried out is retained and the test wind power installation and the comparison wind power installation are changed in terms of at least one operating setting in order to thereby test the structural changes in a plurality of constellations. For this purpose, the at least one further change to the test wind power installation and the comparison wind power installation is preferably carried out synchronously and in the same manner on both wind power installations. As a result, many working points can be approached and the structural modification or its effect can thus be investigated for many working points.

If no structural modification was carried out in the modification step, but a modification of operating settings, different operating settings are therefore compared. The further change to at least one of the operating settings on the test wind power installation and/or the comparison wind power installation in the at least one further comparison interval thus allows further operating settings to be compared with one another. It comes into consideration here that the operating settings are performed on only one of the two wind power installations, i.e. the test wind power installation or the comparison wind power installation, in order to thereby assess the changes by comparing them with the wind power installation that has retained its operating settings. However, it also comes into consideration to change both wind power installations at the same time and to set different operating settings in each case in order to thereby be able to test more operating settings in a shorter time. This also comes into consideration for the first comparison interval, i.e. immediately after the adjustment mode. Here it was recognized in particular that testing many operating settings makes it unnecessary to directly compare a changed operating setting with a known one, because a trend can be identified from the many investigations, in the case of which a statement can be derived even without direct comparison with a known operating setting.

For example, a variation of operating characteristic curves can be investigated and the operating setting of the test wind power installation can be changed in the modification step by changing an originally implemented operating characteristic curve, which was available for both wind power installations in the adjustment mode and is referred to here as a standard operating characteristic curve, into a first operating characteristic curve, while the standard operating characteristic curve remains in the comparison wind power installation. When further changing the operating settings as proposed, a second operating characteristic curve can then be set in the test wind power installation and a third operating characteristic curve can be set in the comparison wind power installation. As a result, three operating characteristic curves are then investigated. If the operating settings are changed even further in an even further comparison interval, a fourth and fifth operating characteristic curve can then be investigated.

However, it also comes into consideration that one of the two wind power installations in each case retains the operating settings from the adjustment mode as standard operating settings, that is to say retains the standard operating characteristic curve in the example mentioned, and different operating settings are gradually made and thereby investigated as the at least one further change in the other wind power installation. It also comes into consideration that, during changing, sometimes the standard operating settings on the comparison wind power installation are retained and sometimes the standard operating settings on the test wind power installation are retained.

According to one aspect, it is proposed that the test wind power installation differs from the comparison wind power installation in at least one of the comparison intervals by at least one differing component part, and the test wind power installation and the comparison wind power installation have matching operating settings in the at least one comparison interval. For example, the test wind power installation may have vortex generators installed on its rotor blades, while no vortex generators are arranged on the comparison wind power installation. Vortex generators can also be arranged on both wind power installations, but they differ from one another. The test wind power installation may also have different rotor blades to the comparison wind power installation, or a different blade tip or boundary layer fences or different boundary layer fences to the comparison wind power installation, to name just further examples.

However, the operating settings of both wind power installations are the same, with the result that the conditions for both wind power installations are the same, except for the at least one differing component part. Now, operating settings can be changed in a further comparison interval, for example the specification of a speed or the change in a blade angle. The effects can then be recorded and compared. From this, an assessment can be carried out for the differing component part.

According to another variant, it is proposed that the test wind power installation and the comparison wind power installation are structurally identical and are operated with different operating settings in the at least one comparison interval in order to assess different performance data caused by the different operating settings. In this case, the test wind power installation and the comparison wind power installation therefore do not have any differing component parts and instead differing operating settings are investigated. A differing operating setting can involve in particular the fact that the two wind power installations use a different operating characteristic curve, namely in particular a speed-power characteristic curve. However, it also comes into consideration that a different blade angle is set. In any case, during partial load operation, a fixed blade angle can often be used, and this can be selected, for example in the test wind power installation as a different or differing operating setting, to be 1 degree larger or 1 degree smaller than in the comparison wind power installation, to name one example. If the blade angle is not constant, it can be stored as a blade angle characteristic curve, which is also referred to as a pitch characteristic curve, and this blade angle characteristic curve can be changed as an operating setting.

Here too, at least one further operating setting can then be changed for both wind power installations in the same manner and synchronously in a further comparison interval. The result can be recorded for both wind power installations and evaluated by comparison.

According to one aspect, it is proposed that the test wind power installation is structurally modified in the modification step, and the test wind power installation and the comparison wind power installation have differing operating settings in the at least one further comparison interval. It is thus provided here that the test wind power installation differs from the comparison wind power installation in terms of at least one differing component part and in addition in terms of at least one operating setting. Thus, there is a double variation here, namely in the component part and in the operating setting, and it is proposed to carry this out in a further comparison interval. In this case, there are therefore at least three time intervals, namely the adjustment interval, in which both installations are operated without differences, the at least one comparison interval, which can be referred to as the first comparison interval and in which only one component part is changed, and the further comparison interval, that is to say at least a third time interval, in which the test wind power installation differs from the comparison wind power installation at least in terms of a component part and in terms of at least one operating setting.

The evaluation can be carried out here in particular in such a way that an evaluation of the at least one comparison interval is taken into account for evaluating the at least one further comparison interval. This makes it possible to first evaluate the effect of the changed component part that was recorded in the first comparison interval in which the operating settings of both wind power installations were still the same. In the further comparison interval, it is then possible to draw conclusions about the changed operating settings from detected differences in the performance.

Here it was recognized in particular that many variations can be tested quickly as a result, namely structural variations and variations in the operating setting. It should be noted in particular that changing a component part can be very time-consuming and costly. It has been recognized that changing a component part may improve the performance in one operating setting, but may not in other operating settings, with the result that additional testing of changed operating settings can avoid a hasty assessment. Operating settings adapted to the structural changes can also be investigated, since different operating settings can often be optimal for different component parts.

According to one aspect, it is proposed that the synchronous changing takes place on the basis of a changeover signal. Such a changeover signal can be specified from the outside or it can be initiated by a time range. It can also be caused by external influences, such as changed wind conditions.

In particular, it is proposed that the changeover signal is transmitted from a central controller, which is superordinate to the test wind power installation and the comparison wind power installation, to the test wind power installation and the comparison wind power installation. This ensures central control and, in particular, also the synchronous changing of both wind power installations. Changing the operating settings can be controlled overall by such a superordinate central controller, but it may also be sufficient for a sequence program to be stored in both wind power installations and for the execution of such a sequence program to then only have to be triggered synchronously by the superordinate central controller. Two sequence programs can then run in parallel on the two wind power installations and, assuming a sufficiently accurate clock in both wind power installations, the synchronicity of the changes can still be ensured.

In particular, it is proposed that the changeover signal triggers a synchronous start of a comparison interval, that is to say a new or further comparison interval in each case. Here, a schedule can be predefined for a comparison interval if the operating settings are not fixed in the comparison interval and/or are changed abruptly at the start of the comparison interval, but rather are changed, for example, by a time ramp. The schedule can also be predetermined with a temporal dependence over the course of the comparison interval, namely may be identical for both wind power installations if they are changed synchronously. Only a corresponding start signal is then required to start the comparison interval with both wind power installations.

According to one aspect, it is proposed that the adjustment interval, the at least one comparison interval and, if appropriate, the at least one further comparison interval each last for a predetermined test time, wherein the test time is in particular in the range of 1 minute to 60 minutes, in particular in the range of 5 minutes to 30 minutes.

Here it was recognized that good comparability can be achieved in particular when the comparison interval is not too short, and therefore it is proposed to take a predetermined test time as a basis for the comparison interval.

As a result of the minimum value of 1 minute, the range of 1 minute to 60 minutes means that a sufficient test can be performed, whereas the restriction to 60 minutes prevents the test phase from taking too long overall. At least, it was recognized that a very large number of comparative tests would have to be carried out for optimization purposes. It would therefore be better not to carry out such a comparison for more than 1 hour.

The preferred value of 5 minutes as the lower limit ensures a longer time, during which many rotor revolutions can also occur, and which is also sufficiently long to allow the wind power installation to also adopt one or even more changed operating points. Here it was taken into account that the rotor in particular has a certain inertia, which in any case prevents an excessively fast change of a rotor speed. With respect to the upper limit of 30 minutes, it was recognized that this facilitates the assumption of a stable operating point even further, but also avoids an excessively long test phase for just one change, with the result that a sufficient number of tests can be carried out in a reasonable amount of time. It is possible to achieve the situation in which the wind power installation can run at least one steady-state operating point.

The duration of the adjustment interval and the comparison intervals is thus chosen in such a way that the wind power installations each have sufficient time to adopt steady-state operating points for the comparative operating settings. Here, time periods of 1 to 60 minutes, in particular approximately 5 to 30 minutes, which have been recognized as suitable, are proposed in particular. During this time, steady-state operating points can be reached for most situations, which may also depend on the respective wind situation.

According to one aspect, it is proposed that at least one from the following list is used as the operating setting to be changed:

a. a speed-power characteristic curve, or a speed-torque characteristic curve,
b. a target speed value
c. a target power value
d. a pitch characteristic curve
e. an azimuth offset angle by which the azimuth orientation deviates from a direction directly into the wind.

A power value or a torque value is respectively specified for captured speeds in the partial load range via the speed-power characteristic curve or speed-torque characteristic curve, depending on the installation type. Such a speed-power characteristic curve—the same applies analogously to the speed-torque characteristic curve—can be changed, for example, such that it is shifted, with the result that, with the same speed values, a higher power or a higher torque is set in each case for the changed operating setting, i.e. the changed speed-power characteristic curve. If the operating settings are otherwise unchanged, this results in the wind power installation fundamentally being operated at a lower speed. This is due to the fact that the power available from the wind in each case would already be set for lower speeds, with the result that a speed-power working point is already established at a lower speed, because the higher power setting prevents a further increase in speed.

A target speed value can be used to specifically change the speed, thereby investigating the effect of a changed speed. In this case, such a target speed value can result in a deviation from a speed-power characteristic curve or a speed-torque characteristic curve, or a target speed value is changed during full-load operation.

It is likewise possible to intervene in the speed-power characteristic curve or speed-torque characteristic curve by changing a target power value. In principle, the power yield is intended to be investigated by changing a target power value, but comparing the effect of loads is considered in particular. It also comes into consideration to investigate a change in the noise emission or noise immission by means of a changed target speed value.

A pitch characteristic curve is in particular a characteristic curve that specifies the pitch angle, i.e. the blade angle of the rotor blades, on the basis of an input variable. In particular, the pitch angle is specified here as a function of the power, in particular a mechanical or electrical power, in particular the generator power, or output power of the wind power installation, or as a function of a torque, in particular a generator torque. This is particularly relevant during partial load operation and it is also considered here that the pitch angle is constant for the entire partial load operation, i.e. is 3°, for example, for the comparison wind power installation and is changed to 4° in at least one of the comparison intervals for the test wind power installation. In particular, a wind power installation is often designed for an optimal tip speed ratio in partial load operation at least in a partial range of partial load operation. For such a tip speed ratio, the wind power installation is intended to work optimally. Based on the pitch angle designed for this and the stored speed-power characteristic curve or speed-torque characteristic curve, an optimum working point, at which maximum power can be extracted from the wind, is then established. Changing the pitch angle also changes this operating point, and the change in power then indicates whether the designed operating point was actually the optimal one, or whether the output power has increased as a result of the change in the pitch angle.

In addition, the change in the speed-power characteristic curve or speed-torque characteristic curve that has already been described is also a possible way of changing the operating point and thus checking whether it was optimal as designed or whether an improvement could be achieved.

Ideally, a wind power installation is oriented precisely into the wind, because it is designed for such operation and can then extract maximum power from the wind. However, aerodynamic phenomena occur, and so this ideal assumption no longer applies. In particular, changes in the wind speed and/or wind direction with altitude can be such a phenomenon. Then it may be that a slight oblique orientation of the wind power installation in terms of its azimuth orientation can improve the power yield. It also comes into consideration that the wind direction detection is not ideal and/or has a systematic error. Such an error can be a sensor error, including an incorrectly oriented sensor, or may stem from the fact that the wind does not ideally flow onto the sensor. An improvement can thus be achieved by an azimuth offset angle.

According to one aspect, it is proposed that the attachment, by which the test wind power installation differs from the comparison wind power installation in the at least one further comparison interval, is an element from the following list:

a. a rotor blade,
b. an aerodynamically active element on one or more rotor blades, in particular serrations, vortex generators and/or Gurney flaps, and
c. a generator.

It therefore comes into consideration that a complete rotor blade on the test wind power installation will be swapped for the at least one further comparison interval. The rotor blade can then have a changed aerodynamic shape and this can be tested.

It comes into consideration that only one single rotor blade or a plurality of rotor blades will be swapped. The three rotor blades of the test wind power installation may also be different.

However, it also comes into consideration, in addition or instead, to arrange an aerodynamically active element on at least one rotor blade. Such aerodynamically active elements and how they act are fundamentally known, but their exact influence on a specific rotor blade and/or various operating ranges and especially for a specific wind power installation at a specific installation location often cannot be sufficiently determined by means of simulations, or such simulations are at least verified by the proposed approach.

Such aerodynamically active elements can be serrations, i.e. a serrated trailing edge or trailing edge serrations. This means that a serrated trailing edge of the rotor blade in question is provided here, but does not have to run over the entire length of the rotor blade. Such serrations can differ in terms of the length and width of the individual spikes, and both the length and width of the spikes can vary depending on the position on the rotor blade. There are thus many possible variations that can be tested for suitability.

Vortex generators are elements that are specifically brought onto the surface of the rotor blade and can advantageously influence the effect of the wind on the rotor blade in terms of power optimization. Vortex generators can differ in terms of their type, size and positioning and can accordingly have different effects on the operation of the wind power installation. Like the other aerodynamic changes, they can influence the generation of power, but also loads and noise emissions.

Known Gurney flaps can also influence the aerodynamics and thus the power yield of the wind power installation. Gurney flaps can also differ in terms of width and length, in particular. The position of the Gurney flaps can also be changed, especially when measured in the longitudinal direction of the rotor blade.

It also comes into consideration to provide the test wind power installation in the modification step and thus for at least one comparison interval with a generator that differs from the generator of the comparison wind power installation. In particular, the generator may differ in terms of its performance level and/or its rated power. In principle, the wind power installations are designed for a certain power, but it also comes into consideration that it will be recognized later that a larger generator that generates more power can be used. Such a higher-power generator can have a lower efficiency, especially in the lower power range, compared to a smaller generator, and here it can therefore be investigated what influence the changed generator has on the power yield as a whole. Differences can also occur in the speed-dependent behavior. Of course, the results can then also be related to the costs of such a larger generator and/or otherwise improved generator.

According to one aspect, it is proposed that the test wind power installation and the comparison wind power installation are structurally identical in at least one of the comparison intervals. This makes it possible to assign the change in the power yield to precisely this one differing component part. This allows specific statements to be made about the effect of the one differing component part on the power yield.

Nevertheless, it is desirable to test various component parts, and another differing component part can be tested gradually in each case for this purpose in one variant. However, instead or in addition, it comes into consideration to test a plurality of component parts at the same time. This can be particularly successful when the respective different component parts have different effects or work in other ranges, for example in different wind speed ranges. However, it also comes into consideration that a sufficiently large amount of data, which allows conclusions to be drawn about the individual component parts, can be captured through the natural variation in the wind speed. It also comes into consideration that one component part has already been at least partially tested and then another component part can be added for testing. From the individual test of the one component part that has already been carried out, its behavior can be assigned to the captured power yield, or other effects investigated. It also comes into consideration that, in contrast to the above proposal to investigate only one component part in each case, the generator is also swapped in addition to a changed component part on the rotor blade, or a generator and other rotor blades are used. This is proposed, in particular, for the fact that, when the generator is enlarged, the rotor blades are also accordingly designed to extract more power from the wind.

According to one aspect, it is proposed that the method is used to measure in each case a power curve of the test wind power installation, wherein power values of the test wind power installation and of the comparison wind power installation are recorded for each comparison mode, in particular are each averaged, and the power curves of the test wind power installation and of the comparison wind power installation are gradually recorded as a result, wherein optionally measured values or estimates of the associated wind speed are recorded.

This makes it possible to achieve a comprehensive picture that provides information about when which change will result in an increase or decrease in power or no change. The dedicated evaluation can also be used to consider boundary conditions, such as installation loads. It is particularly advantageous for this to also record the underlying wind conditions in each case and then to also evaluate them.

If, for example, an increase in power is thus only achieved in a partial range, but this entails an increased installation load, it may be advisable to dispense with this increase in power. In particular, it comes into consideration to also consider how much the service life of the installation is changed during the evaluation. For example, if it is reduced while only a small increase in power is achieved thereby, the increase in power may not result in an overall increase in the energy that can produced in relation to the service life of the wind power installation.

The recording of the associated wind speed can also be used to extrapolate the changed, i.e. for example increased, power yield to one year, i.e. to the so-called annual energy production (AEP). For example, if the increase in power occurs specifically only for wind speeds that rarely occur, the effect for annual energy production is less than if the increase in power could be achieved for frequently occurring wind speeds.

For measurement purposes, it is proposed that power values of the test wind power installation and of the comparison wind power installation are recorded for a sufficiently long period of time for each comparison mode in order to thus record a required stochastic amount which ensures a sufficient number of scattered measured values or measurement situations.

The stochastic amount required specifically for validating the measures may be different for the respective task, which can be referred to as a "performance category". But generally it should be chosen, that is to say the duration of the measurements should be chosen, in such a way that all wind speeds are sufficiently captured. It has been recognized that, for sound measurements or validations, a measurement time of approximately one day results in the required stochastic amount, whereas power and load measurements require a measurement time of approximately 2-3 months.

According to one aspect, it is proposed that at least one further test wind power installation is used, with the result that a plurality of test wind power installations are used overall, and the test wind power installations are modified in the at least one comparison interval so as to differ from one another and/or from the comparison wind power installation, in particular the test wind power installations are modified so as to differ from one another and from the comparison wind power installation in terms of their operating settings.

The test wind power installations can be modified accordingly in the modification step. The test wind power installations can also all, together with the comparison wind power installation, first be adjusted in the adjustment mode, i.e. in particular adjusted with respect to the comparison wind power installation. For this purpose, all test wind power installations and the at least one comparison wind power installation can be operated in the adjustment mode with matching operating settings and structurally in the same manner. However, all test wind power installations and the at least one comparison wind power installation can also be structurally different in the adjustment mode. The effects of the structural differences can then be captured in the adjustment mode.

A plurality of structural modifications and/or modified operating settings can be assessed at the same time by using a plurality of test wind power installations, thus enabling rapid and efficient optimization.

The present disclosure also proposes a wind power installation arrangement comprising at least one test wind power installation and a comparison wind power installation, prepared to assess the test wind power installation, wherein the wind power installation arrangement is prepared to carry out an assessment method, wherein a. a comparison is made between the at least one test wind power installation and the comparison wind power installation for assessment purposes, and the method comprises the steps of
b. synchronously operating the test wind power installation and the comparison wind power installation in an adjustment interval in an adjustment mode, in which the test wind power installation and the comparison wind power installation have matching operating settings,
c. synchronously recording performance data relating to both wind power installations in each case in the adjustment interval in the adjustment mode,
d. modifying the test wind power installation and/or the comparison wind power installation in a modification step such that the test wind power installation and the comparison wind power installation differ from one another,
e. synchronously operating the test wind power installation and the comparison wind power installation, which differ from one another, at least in a comparison interval in a comparison mode,
f. synchronously recording performance data in the comparison mode, and
g. evaluating the performance data recorded in the adjustment mode and comparison mode in an evaluation step.

The wind power installation arrangement can therefore be a wind farm that has the test wind power installation and the comparison wind power installation. There may be other wind power installations in the wind farm which do not participate in the assessment method or which, or some of which, are also used for assessment, either by forming another comparison wind power installation, and thereby providing more reliable comparative values, or by themselves also forming a test wind power installation, with the result that there are then a plurality of test wind power installations. When a plurality of test wind power installations are used, a plurality of variations can be tested at the same time by performing one variation on one test wind power installation and another variation on another test wind power installation. The variation can relate to attachments or to the controller, or both.

The wind power installation arrangement is therefore prepared to carry out a corresponding method. In particular, it is prepared to carry out at least one method according to at least one of the aspects explained above.

The wind power installation arrangement may be prepared by providing at least one control device on which the method is implemented. There may also be a plurality of control apparatuses on each or some of which the method is implemented. In particular, the control devices may each be part of a control device of one of the wind power installations, that is to say a control device of the test wind power installation or a control device of the comparison wind power installation. If only one control device is provided, it can also be part of one of the wind power installations, i.e. in particular part of the comparison wind power installation or the test wind power installation. However, it also comes into consideration that the control device is centrally located in the farm, in particular is part of a farm computer.

According to one aspect, it is proposed that a coordination device is provided and is prepared to coordinate synchronous operation of the test wind power installation and the comparison wind power installation. Such a coordination device can be a central element which is arranged, for example, in a farm computer. This coordination device ensures and is suitably configured, in particular provided with a corresponding program which can be implemented on it, to control the changing of at least one of the operating settings on the test wind power installation and/or the comparison wind power installation, the synchronous operation of the installations and/or the synchronous capture of the performance data so that it runs synchronously. For this purpose, the coordination device can send corresponding control signals to both wind power installations at the same time in order to thereby trigger the synchronous changing, control and/or capture. For example, both wind power installations can then change the same parameter in a predetermined manner, for example via a predefined time ramp. However, it also comes into consideration to swap an operating characteristic curve, which can be carried out accordingly at the same time for both wind power installations, wherein operation is then continued for a predetermined period with the changed operating characteristic curve, and this period is the same for both wind power installations in particular. Its end can also be coordinated by the coordination device.

However, it also comes into consideration that the coordination device synchronously transmits specific values to both wind power installations, i.e. the test wind power installation and the comparison wind power installation, so that both wind power installations receive the same values at the same time.

The coordination device may be arranged in one of the wind power installations, or distributed among both, or the same coordination device may be present in both in order to keep one available for safety, but the coordination device may also be arranged at a central location in the wind farm, such as in a farm controller, or it can also be located remotely, such as in a remote control room which is connected to the wind farm, in particular to the test wind power installation and the comparison wind power installation, via SCADA.

The present disclosure is now explained in more detail below by way of example with reference to the accompanying figures.

Figure 1:
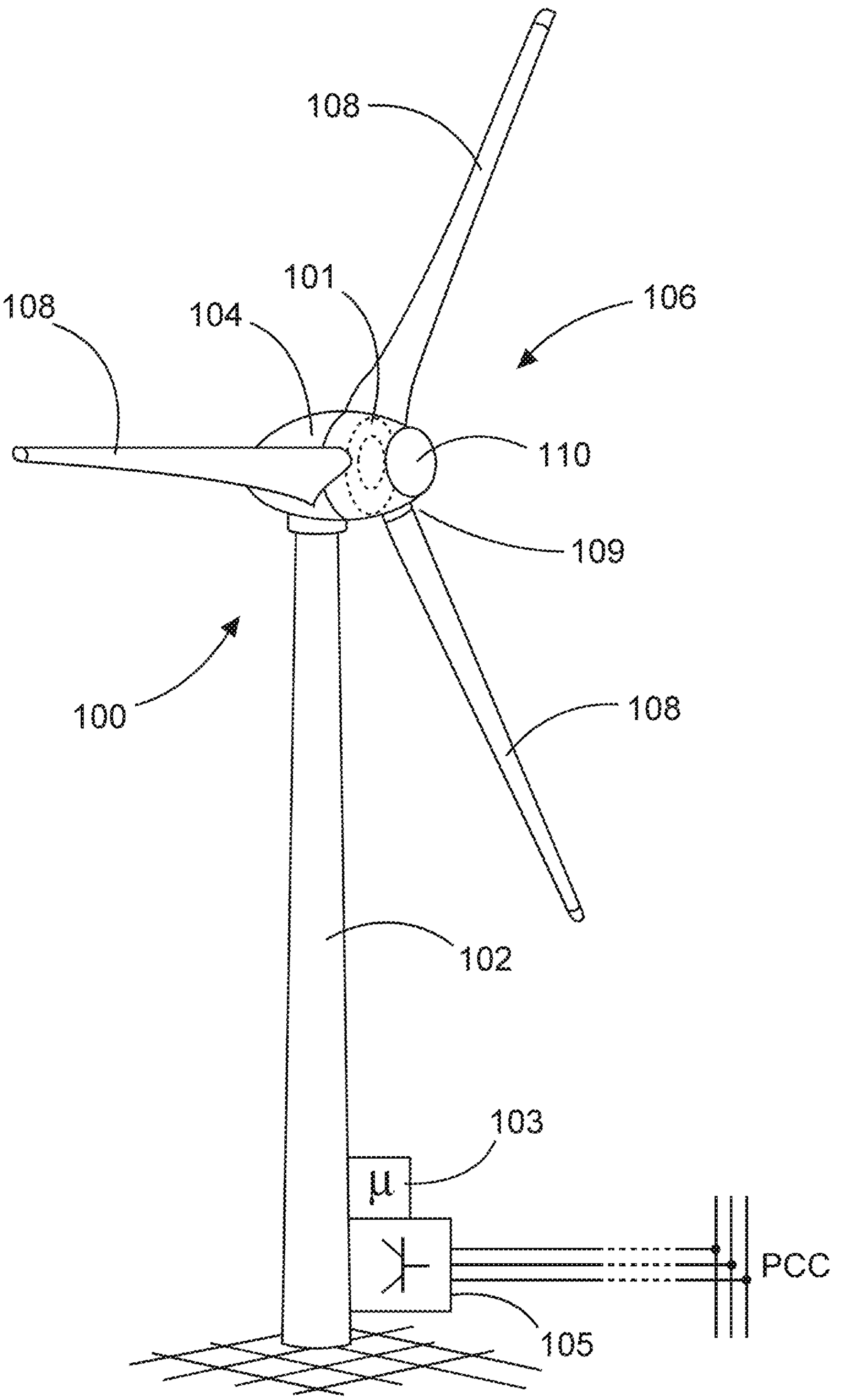
FIG. 1 shows a perspective illustration of a wind power installation.

FIG. 1 shows a schematic illustration of a wind power installation according to some aspects of the present disclosure. The wind power installation 100 has a tower 102 and a nacelle 104 on the tower 102. An aerodynamic rotor 106 having three rotor blades 108 and a spinner 110 is provided on the nacelle 104. During the operation of the wind power installation, the aerodynamic rotor 106 is set in rotational motion by the wind and thereby also rotates an electrodynamic rotor or armature of a generator, which is coupled directly or indirectly to the aerodynamic rotor 106. The electric generator is arranged in the nacelle 104 and produces electrical energy. The pitch angles of the rotor blades 108 may be changed by pitch motors at the rotor blade roots 109 of the respective rotor blades 108.

The wind power installation 100 in this case has an electric generator 101, which is indicated in the nacelle 104. Electrical power can be generated by way of the generator 101. An infeed unit 105, which may be designed in particular as an inverter, is provided for the purpose of feeding in electrical power. It is thus possible to generate a three-phase infeed current and/or a three-phase infeed voltage in terms of amplitude, frequency and phase, for feeding in at a grid connection point PCC. This may be performed directly or else together with other wind power installations in a wind farm. An installation controller 103 is provided for the purpose of controlling the wind power installation 100 and also the infeed unit 105. The installation controller 103 may also receive predefined values from an external source, in particular from a central farm computer.

Figure 2:
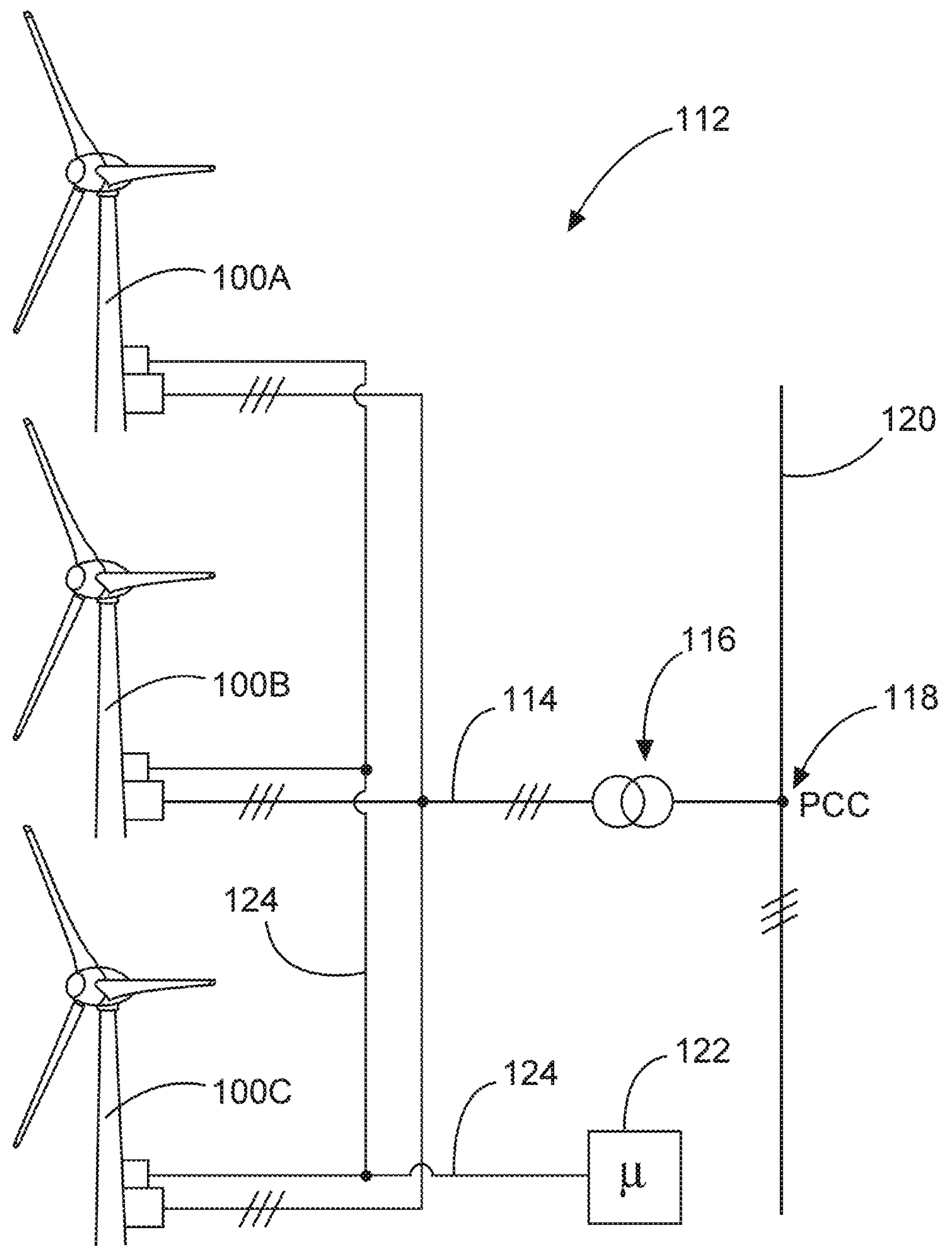
FIG. 2 shows a schematic illustration of a wind farm.

FIG. 2 shows a wind farm 112 having, by way of example, three wind power installations 100 A, 100 B and 100 C which can be the same or different. They are the same, especially in an adjustment mode. They can then be changed. The wind power installations 100 A and 100 B can each form a test wind power installation, and the wind power installation 100 C can form a comparison wind power installation. The three wind power installations 100 A, 100 B and 100 C are also representative of basically any number of wind power installations in a wind farm 112. The wind power installations 100 A, 100 B and 100 C provide their power, specifically in particular the generated current, via an electrical farm grid 114. In this case, the respectively generated currents or powers of the individual wind power installations 100 A, 100 B and 100 C are added up and a transformer 116, which steps up the voltage in the farm, is usually provided in order to then feed into the supply grid 120 at the infeed point 118, which is also generally referred to as the PCC. FIG. 2 is only a simplified illustration of a wind farm 112. For example, the farm grid 114 may be designed differently by virtue of a transformer, for example, also being present at the output of each wind power installation 100 A, 100 B and 100 C, to name just one other exemplary embodiment.

The wind farm 112 additionally has a central farm computer 122, which may also be referred to synonymously as a central farm controller. This can be connected to the wind power installations 100 A, 100 B and 100 C via data lines 124 or wirelessly in order to exchange data with the wind power installations via this connection and in particular to receive measured values from the wind power installations 100 A, 100 B and 100 C and to transmit control values to the wind power installations 100 A, 100 B and 100 C. The central farm computer or the central farm controller may have or form a control device of the wind power installation arrangement, which is prepared to carry out a method according to one of the aspects described. However, such a control device can also be housed individually in each wind power installation.

Figure 3:
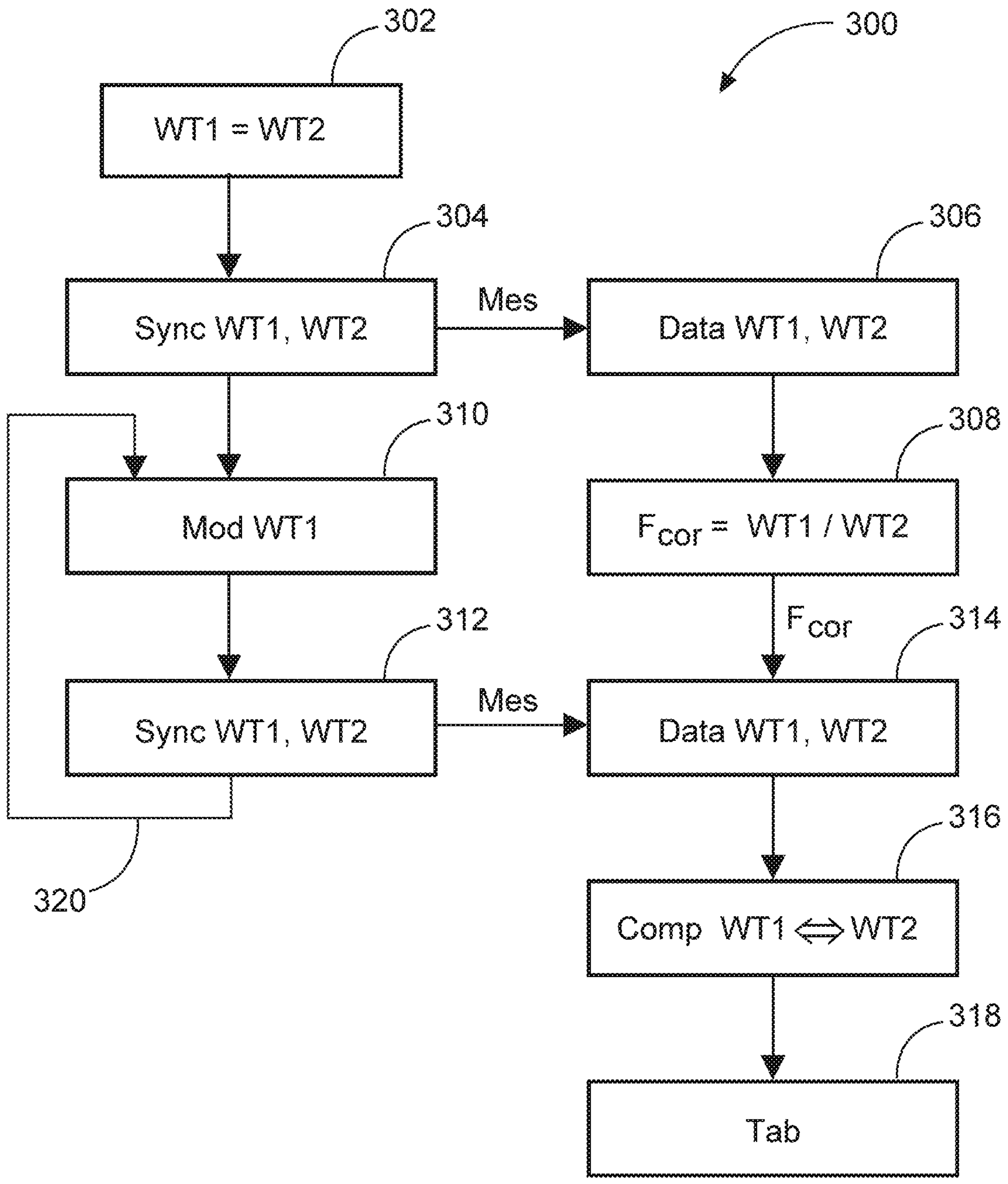
FIG. 3 shows a simplified flowchart of a proposed method.

FIG. 3 shows method steps of the optimization method in the simplified flowchart. The method shown can be implemented in a process computer of one of the wind power installations or in a farm computer.

The flowchart 300 basically begins with the start step 302, according to which the test wind power installation WT1 and the comparison wind power installation WT2, according to one configuration, are provided as structurally identical with all the same operating settings. In an adjustment operating step 304, the two wind power installations, i.e. the test wind power installation WT1 and the comparison wind power installation WT2, are operated in an adjustment interval. The adjustment operating step 304 is representative of or synonymous for an adjustment mode. In this case, both wind power installations are the same, including their settings. However, variations can also be made in the adjustment operating step 304, but in the same manner and synchronously for both wind power installations. During this operation, i.e. in this first comparison interval or comparison period, measurements are recorded and stored, at least temporarily stored, namely for both wind power installations, which is illustrated by the initial data step 306. The test wind power installation WT1 and the comparison wind power installation WT2 can correspond to the wind power installations 100 B and 100 C, respectively, in FIG. 2.

These data thus recorded in the initial data step 306 are used to determine and also quantitatively assess the extent to which the two wind power installations WT1 and WT2 differ in terms of their operation. In particular, the generated power values can be compared and it can be recognized whether, despite assumed equality of both wind power installations WT1 and WT2, differences exist and how large they are.

Such an initial evaluation is illustrated in the initial evaluation step 308. Here, it is possible to determine a correction factor $F_{cor}$ which can be a quotient of the output power of the test wind power installation WT1 to the output power of the comparison wind power installation WT2, which is intended to be illustrated by this initial evaluation step 308 by way of the simplified formula.

However, it should be taken into consideration that it cannot be expected for there to be a single correction factor that fully reflects the difference between the two wind power installations WT1 and WT2. Rather, it can be assumed that the differences between the two wind power installations also depend on the specific operating points and operating settings. For example, not only does one wind power installation always have to produce more power than the other, but it can also be the other way around and there may also be a fluctuation in the specific values.

In this respect, the initial evaluation step 308 should be understood symbolically, but in a simplified case it comes into consideration that a correction factor $F_{cor}$ represents a difference between the two wind power installations well. This can be the case, for example, if one of the two wind power installations always experiences slightly less wind, i.e. weaker wind, than the other wind power installation, due to the terrain on which the two wind power installations are installed.

However, it also comes into consideration that the two wind power installations WT1 and WT2 are already not structurally identical in the adjustment operating step and that differences in the behavior of the two wind power installations caused by the structural difference are captured in the adjustment operating step. Here too, these captured differences, which were evaluated in the initial evaluation step 308, are taken as a basis for the further method.

Once such an adjustment has taken place, the test wind power installation can be modified, which is illustrated by the modification step 310. In the modification step 310, the test wind power installation WT1, for example, can be provided with vortex generators on its rotor blades, while the comparison wind power installation WT2 has no or different vortex generators. In particular, the comparison wind power installation WT2 remains unchanged, i.e. is structurally the same as it was in the adjustment operating step 304.

After the modification step 310, a comparison operating step 312 is then carried out. The comparison operating step 312 basically corresponds to the adjustment operating step 304, but the test wind power installation WT1 and the comparison wind power installation WT2 are not identical in the comparison operating step 312. They differ in particular in that the test wind power installation WT1 was modified in the modification step 310. In the comparison operating step 312, the two wind power installations WT1 and WT2 thus have at least one structural difference and/or at least one different operating setting, e.g. a different operating characteristic curve.

The different wind power installations WT1 and WT2 are then operated in the comparison operating step 312 and at least one operating setting is also changed synchronously for both wind power installations WT1 and WT2. For example, the test wind power installation WT1 could have vortex generators, but not the comparison wind power installation WT2. For these different wind power installations, simultaneous operation of the two wind power installations WT1 and WT2 can then take place in the comparison operating step 312 in order to test and assess the set parameters.

However, in the comparison operating step 312, an identical and simultaneous change can also be carried out for both wind power installations, such as slowly changing the blade angle, for example via a ramp from 2° to 3°. It also comes into consideration to perform the variation in individual steps. For the example of changing the blade angle, this can mean that both wind power installations are first operated at 2°, then, for example after 30 seconds, both wind power installations are operated at a blade angle of 2.5° and even later, especially another 30 seconds later, both wind power installations are operated at a blade angle of 3°. This is also just one example. Another example is that the two wind power installations WT1 and WT2 differ in terms of an operating characteristic curve. A different operating characteristic curve would therefore be set for use for the test wind power installation WT1 than for the comparison wind power installation WT2. For this example, a synchronous change of both wind power installations is then also performed during operation, which can also again be the change of the blade angle, as described above.

This is also just another example of how both wind power installations can be operated with the same synchronous changes.

Data, which are referred to in particular as performance data, are recorded again. In particular, this can be a power generated. These captured data are recorded in the data recording step 314. Correction relationships of which the correction factor $F_{cor}$ is representative are also recorded in the data recording step 314. All these collected data can then be transferred to the evaluation step 316. In this evaluation step 316, the performance data relating to the test wind power installation WT1 can be compared with the comparison wind power installation WT2. For this purpose, the difference, which was determined in the initial evaluation step 308, can be taken into account, that is to say removed, by means of the correction factor $F_{cor}$ or more extensive or other correction data.

The evaluation in the evaluation step 316 can also take into account particularly diverse boundary conditions and operating conditions and can be assigned to the performance data. The performance data or, in particular, the recorded performance of the test wind power installation can be adjusted using the correction factor $F_{cor}$ or corresponding correction data. In the evaluation step 316, the adjusted performance data relating to the test wind power installation WT1 are then compared, in particular, with the recorded performance data relating to the comparison wind power installation WT2. The comparison, with and/or without the calculation of a contrast such as a factor between the performance data relating to the two wind power installations, can be stored.

For example, the adjusted performance of the test wind power installation, together with the performance of the comparison wind power installation, can be stored together with operating parameters such as speed, blade angle and together with environmental conditions such as wind speed, wind direction, gustiness, temperature, air density. For this storage, FIG. 3 illustrates the data storage step 318.

The performance data relating to the two wind power installations, including their contrast if appropriate, that are collected and stored in the data storage step 318 can then be used for optimization. In particular, it is possible to read from these data which changes to the test wind power installation have yielded an advantage, specifically not only at a single working point, but also in the light of the variation of the working point.

Insofar as the modifications of the test wind power installation can also be changed during operation, which is the case in particular for operating settings, an optimization can be carried out based on the assessment and can be carried out in such a way that different modifications are selected for different operating states and/or environmental conditions. For example, a changed operating characteristic curve could have a positive effect at low wind speeds, but it might have a negative effect at higher speeds. In this case, such an operating characteristic curve could only be implemented for the low wind speeds, but not for the higher ones. Of course, based on this illustrative example, the operating characteristic curve could then also only be partially changed accordingly. A new operating characteristic curve could therefore be designed. In this respect, the described method, also according to each aspect described and each claim, can also be referred to as a method for optimization or optimization method.

In order to assess many modifications of the test wind power installation, a repetition loop 320 is also proposed. The repetition loop 320 results in the modification step 310 being carried out again after the comparison operating step 312. In the modification step 310, other modifications are then accordingly carried out as before. It thus also comes into consideration that a structural modification is carried out in one modification step, but a modification of operating settings is carried out in another modification step. In a yet further modification step, these two modifications, i.e. the structural modifications and the modifications of operating settings, can be combined. It is also possible to combine completely new combinations of structural modifications and modifications of the operating settings.

Preferably, it is first checked whether certain modifications make it possible to expect an improvement at all and/or it is checked whether planned modifications, if a plurality of modifications are planned, fit together. For example, it might already be known that only a smaller range of operating characteristic curves fits a certain blade angle, e.g. a particularly large blade angle, in partial load operation, and thus a large blade angle cannot be combined with any other, but suitable, operating characteristic curve.

In addition, the method may be terminated if, as the result of the optimization, appropriate structural modifications and/or modifications of the operating settings have been selected and these are carried out or maintained on the test wind power installation and are also carried out on the comparison wind power installation, or if a sufficient amount of performance data has been recorded. The result can also be applied to other wind power installations, especially those in the same wind farm, but also to other wind power installations that are not located in the wind farm.

In particular, the following was recognized according to the present disclosure.

In the new development phase of a wind power installation, the duration of installation optimization is of great importance. It is important to identify the optimum operating parameters for a wind power installation type as quickly as possible in order to find the perfect constellation of loads, sound and power.

For the validation of new operating parameters, these were previously measured and evaluated, for example in 10-minute intervals, against the reference parameters. This validation takes a very long time, especially if there is only a small free measurement sector in which measurement can be performed.

The present disclosure can be explained using the following examples.

According to a first example, an operating parameter optimization is performed for rotor blade additions (so-called rotor blade add-ons), generators and other elements. In general, alternative component parts relevant to performance (i.e. performance-relevant) can be tested and assessed.

Two wind power installations with different alternative component parts are tested here. Depending on the alternative component part, changes in operating parameters may have a greater or lesser effect on the wind power installation's sound, loads and power than the standard component part to be investigated. In the inventive simultaneous testing of a changed wind power installation and an unchanged wind power installation, which is referred to here as synchronous toggling, the same installation operation, e.g. a pitch characteristic curve or operating characteristic curve (which can also be referred to as a pitch curve or operating curve), and further curves, is respectively run simultaneously for a certain time (e.g. 10 min). For example, the process would start with the standard operating parameters, and an operating parameter optimization is respectively run in a second, third and further interval. Each interval can also be referred to as a toggle interval. The first interval is used to determine the base delta, i.e. how the wind power installations differ in terms of sound, load and/or power due to the alternative component part. In the second and further intervals, the base delta can now be used to make a statement about how changed operating parameters affect the alternative component part. This can provide important insights for the design and operation of the component parts.

According to a second example, an accelerated operating parameter optimization is performed.

This requires two identical wind power installations. Here again, it is important that both wind power installations run the standard operating parameters in a first interval, i.e. in a first toggle interval, so that there is a relative comparison between the two wind power installations. Different performance due to blade angle errors, production inaccuracy, rotor blade condition, etc. is adjusted.

In the next interval, the two wind power installations run different optimized operating parameters. This allows more operating parameter optimizations to be validated faster. In particular, the following constellations are proposed.

In a first interval, both wind power installations are run with standard operating parameters. In a second interval, the two wind power installations are run with different operating parameters. The different operating parameters are used for potential optimization and can therefore also be referred to as different optimizations.

It is also possible, and is proposed, that in the second interval or a further interval one of the wind power installations, e.g. the first one, is run with changed operating parameters according to a first change, but the other is run with standard operating parameters. In yet further intervals, the first of the wind power installations is run with standard operating parameters and the other is run with changed operating parameters according to a second change.

Areas of application of the present disclosure are in particular operating parameter optimization for rotor blade add-ons, changed generators and other applications in which generally alternative performance-relevant component parts are tested with regard to their effect on the load, sound and/or power behaviour of the wind power installation.

Accelerated operating parameter optimization is possible.

Acceleration in the optimization of operating parameters of wind power installations can thus be achieved. Help with the investigation of the optimal operating parameters for alternative component part variants is possible, e.g. for rotor blade add-ons, generator versions and other component part variants.

In particular, the following disadvantages can be improved. An effect of performance-relevant component parts could previously be validated with the following steps. In this case, the performance of a wind power installation was measured beforehand, which could take 2-3 months, and then the alternative component parts were installed and the wind power installation was measured again. Due to the seasonal differences in wind characteristics and/or rotor blade contamination, it was only very difficult to draw conclusions from the changed behaviour, i.e. the changed performance of the alternative component parts and their optimization. The problem has now been overcome.

According to the present disclosure, it was therefore possible to improve the validation of performance-relevant component parts with regard to their effect on the sound, the loads and/or the power. The process of optimizing wind power installation operating parameters can be accelerated.

The invention claimed is:

1. A method for assessing a wind power installation, based on a comparison between a test wind power installation and a comparison wind power installation, the method comprising:

synchronously operating the test wind power installation and the comparison wind power installation in an adjustment interval in an adjustment mode, in which the test wind power installation and the comparison wind power installation have matching operating settings;

synchronously recording performance data relating to the test wind power installation and the comparison wind power installation in the adjustment interval in the adjustment mode;

modifying at least one of the test wind power installation and the comparison wind power installation in a modification step such that the test wind power installation and the comparison wind power installation differ from one another;

synchronously operating the test wind power installation and the comparison wind power installation, which differ from one another, at least in a comparison interval in a comparison mode;

synchronously recording performance data in the comparison mode;

evaluating the performance data recorded in the adjustment mode and the comparison mode; and wherein the adjustment interval and the comparison interval each have a corresponding duration equal to a test time, wherein the test time is in a range of 1 minute to 60 minutes.

2. The method as claimed in claim 1, wherein a further change is made to at least one of the operating settings on the test wind power installation and the operating settings on the comparison wind power installation (in at least one further comparison interval in the comparison mode, performance data relating to the test wind power installation and the comparison wind power installation are recorded synchronously in the at least one further comparison interval, and the performance data recorded in the at least one further comparison interval are evaluated to determine differences between the test wind power installation and the comparison wind power installation.

3. The method as claimed in claim 2, wherein, in at least one of the comparison interval, and the at least one further comparison interval, the test wind power installation differs from the comparison wind power installation by at least one differing component part, and the test wind power installation and the comparison wind power installation have matching operating settings, or the test wind power installation and the comparison wind power installation are structurally identical, and the test wind power installation and the comparison wind power installation are operated with different operating settings in order to determine different performance data caused by the different operating settings.

4. The method as claimed in claim 2, wherein the test wind power installation is structurally modified in the modification step, and the test wind power installation and the comparison wind power installation have differing operating settings in the comparison interval or the at least one further comparison interval.

5. The method as claimed in claim 1, wherein the test wind power installation and the comparison wind power installation are synchronously modified based on a changeover signal, the changeover signal is transmitted from a central controller, which is superordinate to the test wind power installation and the comparison wind power installation, to the test wind power installation and the comparison wind power installation, and the changeover signal triggers a synchronous start of the comparison interval.

6. The method as claimed in claim 2, wherein the at least one further comparison interval has a corresponding duration equal to the test time.

7. The method as claimed in claim 1, wherein the operating settings include at least one of:

a speed-power characteristic curve, or a speed-torque characteristic curve, a target speed value, a target power value, a pitch characteristic curve, and an azimuth offset angle by which an azimuth orientation deviates from a direction directly into the wind.

8. The method as claimed in any of claim 1, wherein an attachment by which the test wind power installation and the comparison wind power installation differ is at least one of:

a rotor blade, an aerodynamically active element on one or more rotor blades, serrations, vortex generators, and Gurney flaps, and a generator.

9. The method as claimed in claim 2, wherein

The test wind power installation and the comparison wind power installation are structurally identical in at least one of the comparison interval and the at least one further comparison interval except for at least one differing component part.

10. The method as claimed in claim 1, wherein the method is used to measure a power curve of the test wind power installation, wherein power values of the test wind power installation and the comparison wind power installation are recorded for each comparison mode, and the power curve of the test wind power installation and a power curve of the comparison wind power installation are gradually recorded as a result, wherein estimates of wind speed associated with the power values are recorded.

11. The method as claimed in claim 1, wherein at least one further test wind power installation to yield a plurality of test wind power installations are used, and the plurality of test wind power installations are modified in the comparison interval such that respective operating settings of one or more of the plurality of test wind power installations differ from one another or from the operation settings of the comparison wind power installation.

12. A wind power installation arrangement comprising at least one test wind power installation and a comparison wind power installation, prepared to assess the test wind power installation, wherein the wind power installation arrangement is prepared to carry out an assessment method, wherein a comparison is made between the at least one test wind power installation and the comparison wind power installation, and the assessment method comprises:

synchronously operating the test wind power installation and the comparison wind power installation in an adjustment interval in an adjustment mode, in which the test wind power installation and the comparison wind power installation have matching operating settings, synchronously recording performance data relating to the test wind power installation and the comparison wind power installation in the adjustment interval in the adjustment mode;

modifying at least one of the test wind power installation and the comparison wind power installation in a modification step such that the test wind power installation and the comparison wind power installation differ from one another;

synchronously operating the test wind power installation and the comparison wind power installation, which differ from one another, at least in a comparison interval in a comparison mode;

synchronously recording performance data in the comparison mode;

evaluating the performance data recorded in the adjustment mode and the comparison mode; and wherein the adjustment interval and the comparison interval each have a corresponding duration equal to a test time, wherein the test time is in a range of 1 minute to 60 minutes.

13. The wind power installation arrangement as claimed in claim 12, wherein at least one control device of the wind power installation arrangement, is configured to implement the assessment method.

14. The wind power installation arrangement as claimed in claim 12, wherein a coordination device is provided for coordinating synchronous modification of the test wind power installation and the comparison wind power installation.

* * * * *